W. H. STEARRETT.
Dumping Wagon.

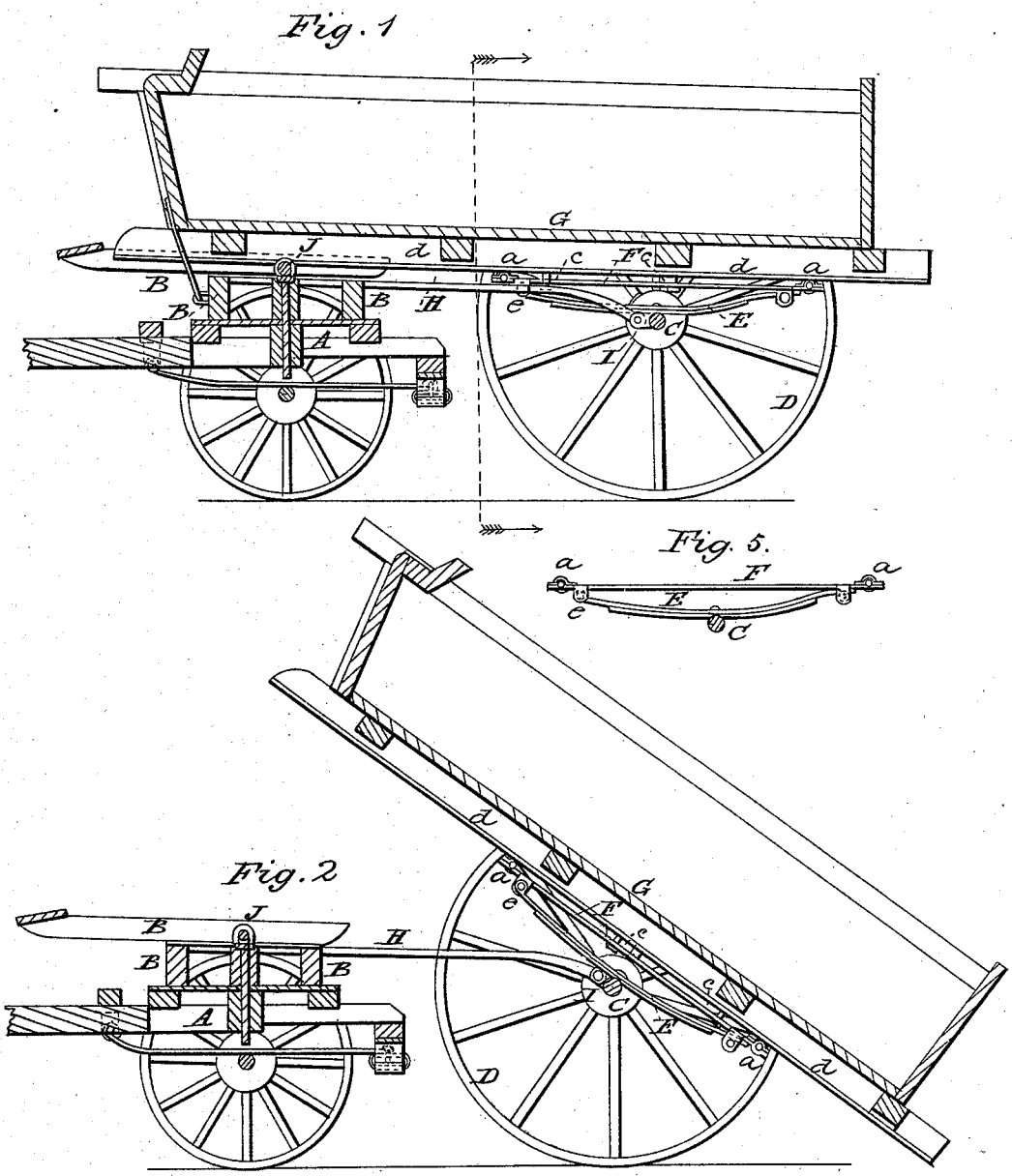

Patented Sept. 14, 1869.

Witnesses:

Inventor:
William H. Stearrett
By his Attorneys
Opperman & Johnson

United States Patent Office.

WILLIAM H. STEARRETT, OF WILMINGTON, DELAWARE.

Letters Patent No. 94,850, dated September 14, 1869.

IMPROVED DUMPING-WAGON.

The Schedule referred to in these Letters Patent and making part of the same.

*To all whom it may concern:*

Be it known that I, WILLIAM H. STEARRETT, of Wilmington, in the county of New Castle, and State of Delaware, have invented certain new and useful Improvements in Dumping-Wagons; and I do hereby declare that the following is a full, clear, and exact description of the same, reference being had to the accompanying drawings, making part of this specification, and in which—

Figure 1 represents a vertical longitudinal section of a wagon embracing my improvements.

Figure 2 represents a similar section, the wagon-body being shown in the position as dumped.

Figure 5 represents an elevation of one of the springs and supporting-plates detached from the wagon.

My improvement relates to the employment of horizontal supporting-plates, secured directly to the springs and rear axle of the wagon, in such manner that the wagon-body may be both supported upon and locked to the plates, and the latter, the springs, and the axle, turn with the wagon-body, whereby the dumping of the wagon is greatly facilitated; in providing the horizontal supporting-plates with slots and rollers, whereby the body of the wagon is both locked to and slides upon supporting and turning plates; in a wagon, having its rear axle connected to and turning with the body, uniting the front truck-frame to said turning axle, by curved hinged connecting rods; and also the arrangement upon a front truck-frame of a transverse roller, for running the body of the wagon back upon the supporting-plates, to dump the load.

In the accompanying drawings—

A represents the front truck of the running-gear of the wagon, which may be constructed in any approved manner, to which is connected, by king-bolt, the front supporting-frame B of the wagon.

The axle C, of the rear supporting-wheels D, is secured to semi-elliptical springs E, to which are secured horizontal plates F, upon which the wagon-body is both supported and locked.

These plates, with their springs, are secured permanently to the axle C, so that the latter must turn with the dumping of the wagon-body G, and they are of a length a little greater than that of the springs, and are provided with anti-friction rollers $a$, at each end, upon which the wagon-body rests.

Figure 3:
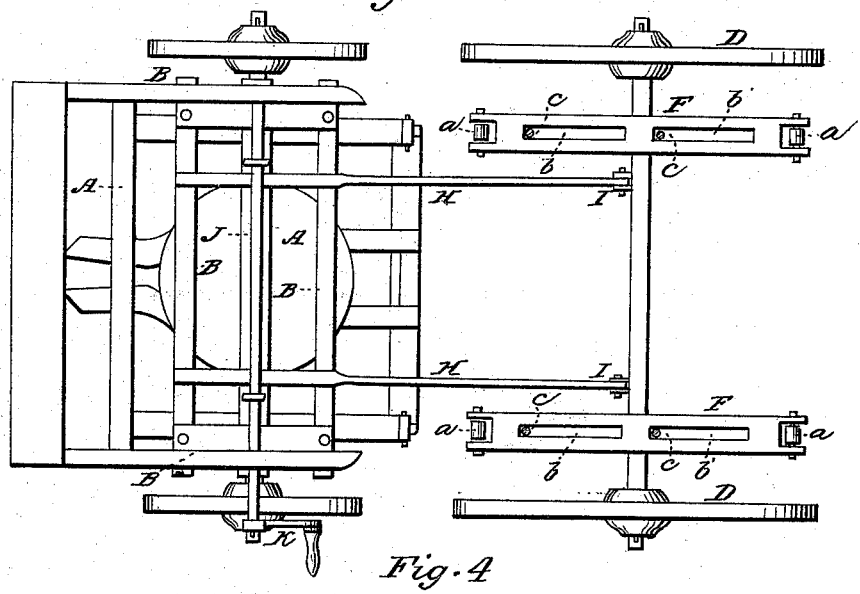
Figure 3 represents a plan or top view of the running-gear of the wagon, showing the horizontal slotted locking and supporting-plates for the body of the wagon.
Figure 4:
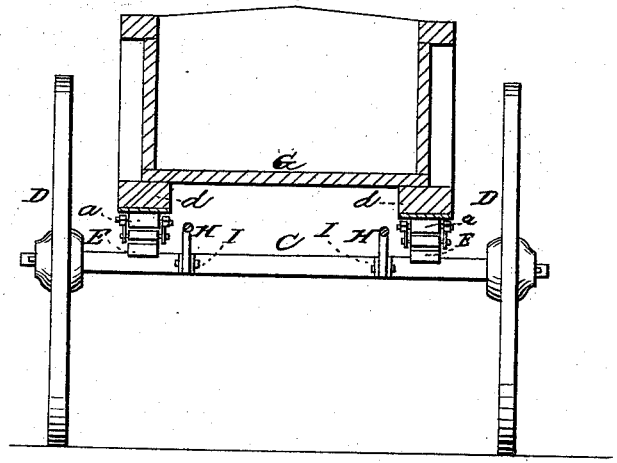
Figure 4 represents a vertical transverse section of the wagon at the line $x\ x$ of fig. 1.

They are also provided with slots $b\ b'$, fig. 3, arranged in the same line, and of two sections, into each of which project pins $c$, from the lower parallel rails of the wagon-body.

The lower ends of these rails are fitted with plates $d$, which constitute the ways of the wagon-body, and the springs and their supporting-plates must therefore be arranged a distance apart equal to that of the ways.

The pins $c$, which project into the slots $b\ b$ of the supporting-plates, are provided with heads, which fit against the under side of said supporting-plates F, thereby locking the body of the wagon to the plates, and the slots are of a length to admit of the proper degree of movement of the wagon-body to effect the dumping.

Each end of the slots, therefore, forms a bumper, and limits the movement of the wagon-body upon the plates.

From the foregoing, it will be observed that while the body G is locked to the supporting-plates F, it is free to move back and forth thereon.

This arrangement also admits of the axle being fixed to the springs and plates, but for which arrangement, the body of the wagon would have to be run back to the end of the springs, in order to dump it, which would also necessitate the employment of a short body.

The semi-elliptical springs E are hinged at one end, $e$, to the under side of the supporting-plates, and at their rear ends are confined, so as to be free to slide against the said plates, to permit the yielding of the springs.

The supporting-plates F being fixed directly to the axle C, the latter serves as the axis of the body in turning, and this irrespective of its position upon the plates, as the plates, the springs, and the axle turn with the movement of the body, by which it will be seen that the entire weight and jar in bringing the wagon-body back to a horizontal position after the load is dumped, is borne alike on both ends of the supporting-plates and the axle, and not upon one end of the springs only, which arrangement adds greatly to the durability of the springs, and facilitates the operation of dumping.

The rear axle C being arranged to turn with the body of the wagon, the front truck-frame A is therefore united with the rear axle by two connecting-rods, H, secured to the front supporting-frame B, and hinged to the said rear axle.

These connecting-rods are curved upward from their hinges I, so as to permit the front wheels to pass under them in turning the wagon.

The front supporting-frame B is provided with a small roller, J, secured in suitable bearings across the frame, and in such position as that the ways $d$ of the lower rails of the wagon-body, when down, will rest thereon, and by means of a crank, K, applied to the end of this roller, which projects beyond the frame for this purpose, the wagon-body may be started in its movement to dump the load, or moved upon its ways the length of the slots $b\ b'$, to effect the dumping.

The wagon-body is locked to the supporting-plates F in such a position that the weight thereof will preponderate forward, and its front end is fastened by hook, or in any suitable manner, to the front supporting-frame.

A pinion on the roller J, matching into a rack on the wagon-body, may be used.

Having described my invention,

I claim—

1. The combination of the springs E and the turning axle C, to which they are secured, with the horizontal supporting and locking-plates F, for the wagon-body, constructed and arranged substantially as described.

2. The horizontal plates F, having supporting-rollers $a$ at each end, and slots $b\ b'$, by which the body is both supported upon and connected with the plates, by the locking-pins $c$, in the manner described.

3. The curved connecting-rods H, secured to the front truck-frame, and hinged to a rear turning axle, C, in the manner described.

WILLIAM H. STEARRETT.

Witnesses:
WM. A. MIX,
T. H. UPPERMAN.